J. G. HANSLER.
PULLEY.
APPLICATION FILED MAY 15, 1906.
916,308.
Patented Mar. 23, 1909.
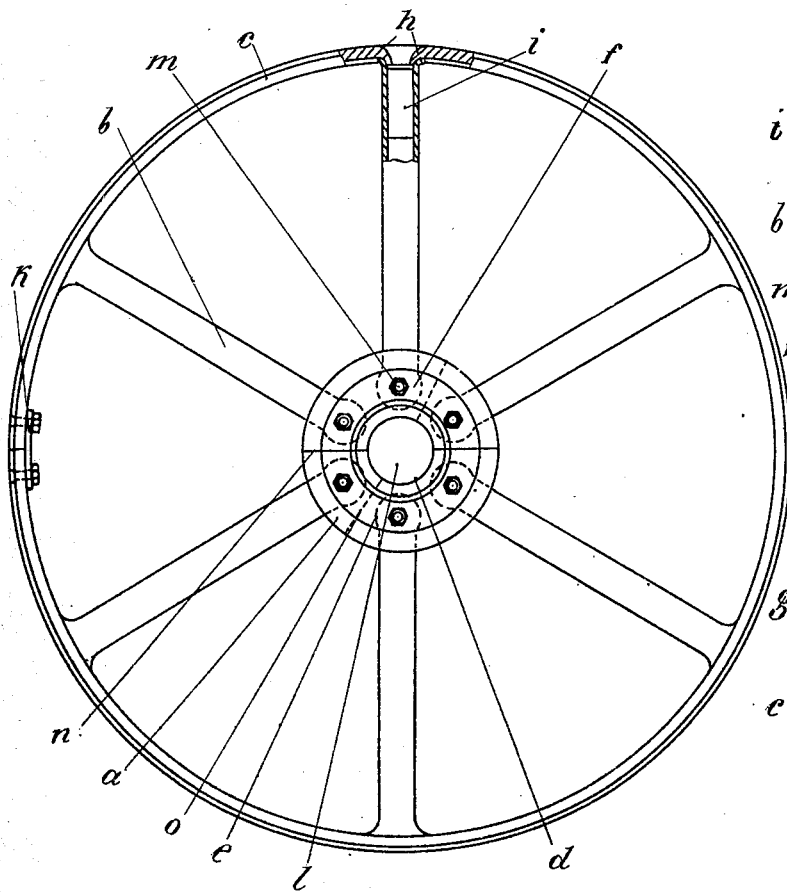
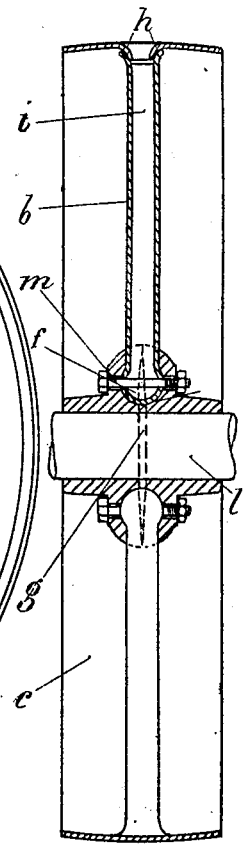
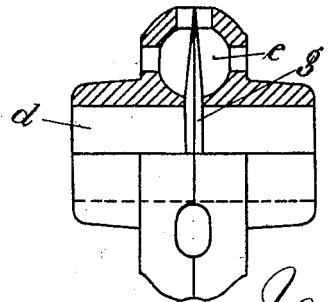

UNITED STATES PATENT OFFICE.

JOHANN GEORG HÄNSLER, OF MUNICH, GERMANY.

PULLEY.

No. 916,308.　　　　Specification of Letters Patent.　　　　Patented March 23, 1909.

Application filed May 15, 1906.　Serial No. 316,970.

*To all whom it may concern:*

Be it known that I, JOHANN GEORG HÄNSLER, engineer, citizen of Germany, residing at Mannhardtstrasse 7/1, Munich, Germany, have invented certain new and useful Improvements in Pulleys; and I do hereby declare the following to be a full, clear, and exact description of the invention, such as will enable others skilled in the art to which it appertains to make and use the same.

This invention relates to an improved pulley and has for its object the provision of a pulley which shall be very light and at the same time strong, and which may be readily placed in position upon or removed from a line of shafting without disturbing the mounting of the shaft or interfering with other pulleys already secured thereon.

Having these objects in view, the invention consists in the features of construction hereinafter more fully described and particularly set out in the claims, a preferred embodiment of the invention being illustrated in the accompanying drawings, in which:

Figure 1 is a side elevation of such a pulley partly in section; Fig. 2 is a vertical section; and Fig. 3 is a detail of the hub partly in elevation and partly in longitudinal section.

The hub $a$ of the pulley consists, as shown, of four parts, although more may be employed. Within the hub are secured in a manner hereinafter more fully described the tubular spokes $b$, which may be made of steel tubing, while at the outer extremities, the spokes are joined to a rim $c$ made of bent sheet metal. The hub $a$ is provided in its central portion with the usual bore $d$ of a diameter corresponding to that of the shaft to be employed, while annularly arranged about the center are spherical cavities $e$ to accommodate the knob-like inner ends $f$ of the spokes $b$.

The hub $a$ in its general outward contour is similar to the ordinary hub and is divided into its four parts by planes extending one through the axis thereof and another at right angles to the axis on a medial line. The two abutting faces of the hub portions cut by the plane at right angles to the axis are slightly hollowed out to form a disk-like central cavity $g$, as indicated in Figs. 2 and 3.

The rim $c$ of the pulley is, at intervals corresponding to the location of the several spokes, punched inwardly to form lips at $h$ to engage with the hollow ends of the spokes which are riveted thereto, riveting stocks $i$ being seated within the ends of the spokes for this purpose, while the two extremities of the steel sheet forming the rim are brought together and suitably secured by the clip $k$ in a known manner.

If it be desired to assemble the described parts in the shape of a complete pulley upon a given shaft, it is only necessary to loosen the clip $k$ allowing the two ends of the rim to spring apart to permit the passage of the shaft therethrough. At this time, the hub parts are supposed to be disassociated and the shaft is brought into its position centrally of the wheel rim, whereupon the two extremities of the rim are again brought together and secured by the clip $k$. The two parts of the hub forming the right-hand half thereof are placed one above and one below the shaft with their opposing faces arranged in juxtaposition about the line $n$, Fig. 1. The two parts of the hub forming the left-hand side thereof are similarly placed upon the shaft with their opposing faces occupying a position indicated by the line $o$ angularly displaced relative to the line $n$. The right and left-hand halves of the hub now embrace, within their spherical cavities $e$, the knobs $f$ upon the inner ends of the spokes and, by means of the bolts $m$ connecting the two halves of the hub via the knob ends of the spokes, are drawn together so as to loosely clasp and engage the ends $f$. The two extremities of the rim are now drawn tightly ogether by the clip $k$ by which action the hub is caused to tightly grip the shaft. The bolts $m$ are then still further tightened and, in consequence of the hollowed cavity $g$ between the opposing faces of the hub-halves, the tension exerted by the bolts transmits a strong inward pressure and gives the hub a firm grip upon the contained shaft so as to render entirely unnecessary other fastening means.

A pulley constructed according to the present invention possesses, among others, the advantages that it can be readily placed upon or taken from a shaft without disturbing other pulleys or the mounting of the shaft itself; it has great stability and favorable distribution of mass; it is only about half the weight of an ordinary wrought pulley and about one-fifth the weight of a cast iron pulley; the resistance presented to the air is small; on account of the distribution of its mass, its operation at high speeds is faultless; it has a symmetrical and altogether pleasing appearance; and, while made of a good quality of steel, it is practically no more expensive than a pulley of cast iron, as it is only about twenty per cent. as heavy. Moreover, the manufacture is so simple that, notwithstanding the great advantages of the pulley, it is considerably cheaper to make than built up or cast pulleys of the old types.

Having thus described my invention, what I claim as new and desire to secure by Letters Patent, is:

1. In a pulley, the combination, with a rim, and spokes secured to and projecting inwardly therefrom, of a hub joining the ends of the spokes and divided upon a plane at right angles to its axis into a plurality of parts having concave opposing faces, and means to clamp the parts of the hub together in their concave portion.

2. In a pulley, the combination with a rim formed of a metal band with its ends secured together, and spokes secured to and projecting inwardly therefrom, of a hub divided upon a plane at right angles to its axis into a plurality of parts having concave opposing faces, and means for drawing the concave parts of the hub together upon the inner ends of the spokes and the shaft.

3. In a pulley, the combination with a rim formed of a metal band, a clip uniting the ends of the band, and spokes secured to and projecting inwardly therefrom and having knob ends, of a hub divided upon a plane at right angles to its axis into two halves, the two parts having concave opposing faces and also provided near the outer edge thereof with a series of hollows, and means for clamping the two halves of the hub together with the knob end of each spoke embraced within the corresponding hollows formed in the opposing faces of the halves.

4. In a pulley, the combination with a rim formed of a metal band, a clip uniting the ends of the band, and spokes secured to and projecting inwardly therefrom and having knob ends, of a hub divided upon a plane at right angles to its axis into two halves having opposing concave faces with a series of hollows annularly arranged, each half of the hub divided parallel to its axis into a plurality of parts, and bolts connecting the two halves of the hub and passing through the knob ends of the several spokes and clamping the same within the corresponding hollows of the halves.

5. In a pulley, the combination with a rim formed of a metal band, a clip uniting the ends of the band, and spokes secured to and projecting inwardly therefrom and having knob ends, of a hub divided upon a plane at right angles to its axis into two halves having concave opposing faces and provided with a series of hollows annularly arranged for the reception of the inner knob ends of the spokes, and bolts passing through the knob ends of the spokes and the two halves of the hub and clamping the same securely together, each half of the hub divided into a plurality of parts on lines parallel to the hub axis, the lines of division between the different parts of the two halves being angularly displaced relative to each other to break joints.

In testimony whereof I hereunto affix my signature in the presence of two witnesses.

JOHANN GEORG HÄNSLER.

Witnesses:
   E. HUTENER,
   LOUIS T. MUELLER.